Feb. 18, 1969  M. E. HONOR, SR  3,428,360
GLARE SHIELD ATTACHMENT FOR AUTOMOBILE SUN VISORS
Filed June 6, 1967
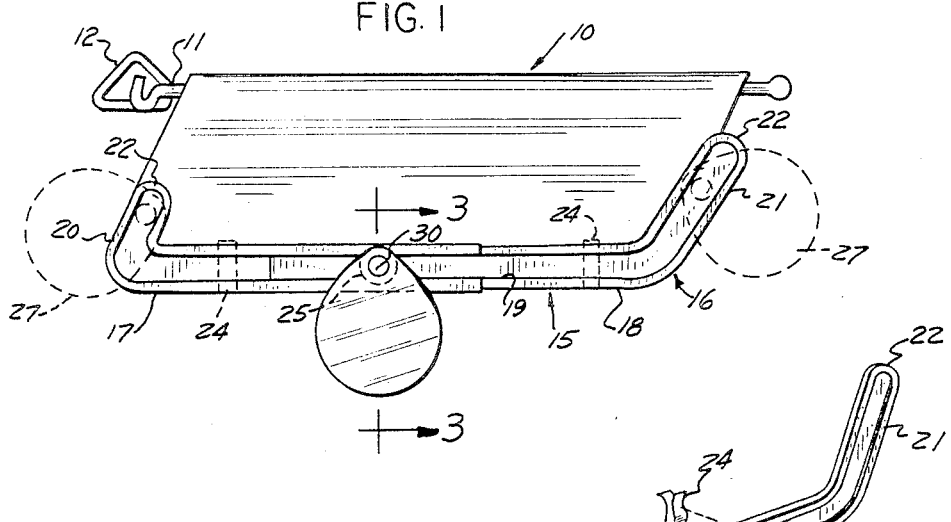
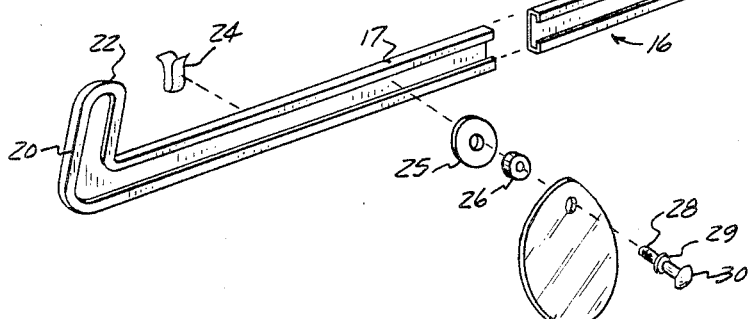
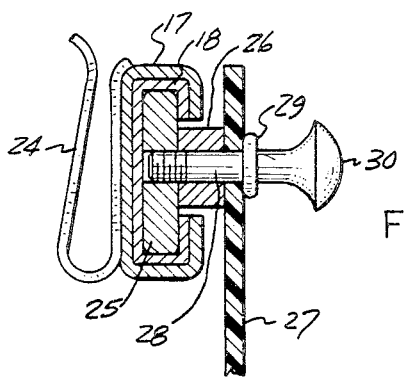
INVENTOR
MUREL E. HONOR, SR.
BY *Cullen, Sloman, & Cantor*
ATTORNEYS United States Patent Office 3,428,360
Patented Feb. 18, 1969

3,428,360
GLARE SHIELD ATTACHMENT FOR
AUTOMOBILE SUN VISORS
Murel E. Honor, Sr., 8047 Robson,
Detroit, Mich. 48228
Filed June 6, 1967, Ser. No. 639,820
U.S. Cl. 296—97          1 Claim
Int. Cl. B60j 3/02

ABSTRACT OF THE DISCLOSURE

An adjustable glare shield attachment, for automobile sun visors, including an adjustable-in-length track to be clipped to the lower edge of the visor, the track having upwardly directed end portions; a circular, magnetized slider is held within the track, with a glare shield fastened to the slider, so that the slider, with the shield, may be magnetically held in selected positions relative to the track.

*Background of invention*

A conventional automobile sun visor generally consists of a horizontally elongated panel supported at its upper edge by a rod having one end secured to a bracket, in turn fastened to the automobile structure directly above the windshield. The purpose of such visor is to block out the direct glare of the sun coming through the windshield. However, at times the angle of the sun is such that the main glare of the sun just clears the sun visor, that is, being below or to one side of the sun visor, so that the sun visor is ineffective for its purpose.

In order to avoid such glare around the visor, small size, substantially transparent, glare screens have been used, these being fastened to the sun visor in one way or another. Such screens, while not completely blocking forward view, do reduce the glare of the sun substantially.

However, since the angle of the sun and the glare therefrom varies considerably from time to time, it is desirable to provide a means for fastening a glare screen to the sun visor in such a way that the glare screen can be adjusted to a variety of positions with such adjustment being extermely simple and requiring no more than a fast manual movement.

Prior art attempts to provide such an assembly have resulted in glare screens which are fastened to the sun visor in such a way as to require either a considerable manual manipulation of fastening means or alternatively, the glare screens are not movable along the length of and edges of the visor.

Other prior art attempts have utilized sun visor glare screens of a length substantially equal to the length of the visor. These, however, tend to block off too much of the driver's view, that is, not only blocking off the glare, but also a substantial portion of normal visibility, and therefore such devices have been unsatisfactory.

*Summary of invention*

Hence, it is an object of this invention to provide a glare screen attachment for a sun visor, wherein the glare screen may be easily movable to positions along the entire length of and along the side edges of the sun visor and is magnetically held in position, with the glare screen being of relatively small size and designed merely to block the direct glare of the sun rather than to obstruct a greater area of visibility.

A further object of this invention is to provide an attachment including an elongated track which is adjustable to the length of a particular sun visor and with upwardly turned end extensions, with the track receiving a rotatable and slidably movable slider to which the glare screen is attached, with the slider being magnetic so that the glare screen may be either rotatably adjusted or slidably adjusted merely by simple manual movetment thereof.

Summarizing, this invention contemplates an adjustable track for fitting along the lower edge and opposite sides of a conventional sun visor, with a magnetized rotatable and slidable slider fitted within the track and a glare screen connected to the slider for movement therewith.

These and other objects and advantages of this invention will become apparent upon reading the following description, of which the attached drawings form a part.

*Description of drawings*

In the drawings:

FIG. 1 is an elevational view of a conventional automobile sun visor with the glare shield attachment secured thereto.

FIG. 2 is a perspective, exploded view of the glare shield attachment.

FIG. 3 is an enlarged cross-sectional view of the glare shield attachment, per se, taken in the direction of arrows 3—3 of FIG. 1.

*Detailed description*

FIG. 1 illustrates a conventional automobile sun visor 10 which is in the shape of a horizontally elongated panel supported at its upper end by a support bar 11 extending the length thereof. One end of the support bar is secured to a bracket 12 which in turn is fastened to the automobile, above the windshield. The particular sun visor illustrated in FIG. 1 is of the shape for fitting in front of the driver's seat of an automobile.

The glare shield attachment 15 includes a channel-shaped track 16 formed of a ferrous material. As illustrated in FIG. 2, the track is preferably formed of two sections 17 and 18, which are telescopically interconnected for adjusting the length of the track to a particular length sun visor.

As shown in FIG. 3, the track channel is relatively flattened and squared in cross-section with flanges extending towards each other to form a relatively narrow, continuous slot 19 which extends the full length of the channel.

The opposite ends of the track are upwardly turned to form track end extensions 20 and 21, with the right-hand extension (see FIG. 1) preferably being higher than the left-hand one.

These track end extensions are formed with closed ends 22, the closures being formed merely by extending the bent flanges forming the channel shape or alternatively by striking out portions of the metal at the ends of the track.

A number of U-shaped resilient clips 24 (see FIG. 3) are fastened to the track for removably clipping the track to the lower edge of the sun visor.

Closely fitted within the track is a circular, flattened disk-shaped slider formed of a magnetic material. The slider is movable along the length of the track as well as rotatable about its own axis and is held in position due to the magnetic force against the track. The configuration of the track itself prevents the slider from falling out of the track or away from the track due to jarring or bumping of the automobile.

Referring to FIG. 3, a spacer washer 26 extends through the slot 19 into contact with the slider and a glare screen or shield 27 is arranged at the opposite face of the spacer.

The screen is fastened to the slider by means of a bolt 28 which extends through openings formed in the screen, spacer and slider, with the opening of the slider being threaded to receive the bolt. Such bolt is provided with an annular shoulder 29 for clamping the screen in place against the spacer. The bolt terminates in a gripping knob 30.

While a fastening bolt is illustrated herein, other suitable fastening means may be selected, such as riveting or other permanent fasteners. Likewise, the shape of the gripping knob may be varied so long as there is an extending portion for hand grasping.

*Operation*

In operation, the track is adjusted to the proper length for a particular visor and then is clipped to the visor, using the resilient clips 24 and positioning the track as illustrated in FIG. 1.

The driver, by grasping the gripping knob 30, may position the glare shield either downwardly as shown in FIG. 1, or upwardly out of the way, and from time to time, may slide it and rotate it as necessary, as illustrated, for example, by the dotted lines in FIG. 1, into a position to block off direct sun glare coming around the visor.

Having fully described an operative embodiment of this invention, I now claim:

1. In combination with an automobile sun visor having a glare shield attachment including an elongated horizontally arranged channel-shaped track having a continuous relatively narrow slot extending its full length, with means for removably fastening the track to the lower edge of the rear face of the visor, with the slot thereby opening rearwardly of the visor; and with a glare shield;

means for mounting the shield on the track comprising a circular disk-shaped slider closely fitted within the track and arranged to be slidably and manually movable along the length of the track and be manually and rotatably movable about an axis perpendicular to the length of the track;

a bolt threadedly connected to the slider and perpendicular to it and extending outwardly of the track through said slot and secured to the glare shield for joint movement of the slider, the bolt, and the shield; with the shield being positioned rearwardly of and in a plane parallel to the visor;

said slider being formed of a magnetized material and the track being formed of a ferrous material, whereby the slider may be magnetically clamped in place in any selected position within the track.

References Cited

UNITED STATES PATENTS

| | | | |
|---|---|---|---|
| 2,603,530 | 7/1952 | Jones | 296—97 |
| 2,894,576 | 7/1959 | Williams | 296—97 |
| 3,095,233 | 6/1963 | Dryden | 296—97 |
| 3,158,396 | 11/1964 | Berger | 296—97 |
| 3,246,925 | 4/1966 | Calabrese | 296—97 |
| 3,306,657 | 2/1967 | Turner | 296—97 |

LEO FRIAGLIA, *Primary Examiner.*

L. D. MORRIS, JR., *Assistant Examiner.*